United States Patent
Park et al.

(10) Patent No.: US 11,609,442 B2
(45) Date of Patent: Mar. 21, 2023

(54) SYSTEM AND METHOD FOR CUSTOMIZATION OF A PHOTOCHROMIC ARTICLE

(71) Applicant: Transitions Optical, Ltd., Tuam (IE)

(72) Inventors: David J. Park, Tuam (IE); Anil Kumar, Murrysville, PA (US); Brian Smyth, Tuam (IE)

(73) Assignee: Transitions Optical, Ltd., Tuam (IE)

(*) Notice: Subject to any disclaimer, the term of this patent is extended or adjusted under 35 U.S.C. 154(b) by 331 days.

(21) Appl. No.: 16/957,870

(22) PCT Filed: Dec. 27, 2017

(86) PCT No.: PCT/EP2017/084634
§ 371 (c)(1),
(2) Date: Jun. 25, 2020

(87) PCT Pub. No.: WO2019/129343
PCT Pub. Date: Jul. 4, 2019

(65) Prior Publication Data
US 2021/0055575 A1  Feb. 25, 2021

(51) Int. Cl.
*G02C 7/10* (2006.01)
*G02C 7/02* (2006.01)
(Continued)

(52) U.S. Cl.
CPC .............. *G02C 7/102* (2013.01); *B01J 19/12* (2013.01); *G02B 1/12* (2013.01); *G02C 7/024* (2013.01);
(Continued)

(58) Field of Classification Search
CPC ...... G02C 7/102; G02C 7/024; G02C 13/001; G02C 2202/16; G02C 7/105; B01J 19/12;
(Continued)

(56) References Cited

U.S. PATENT DOCUMENTS

| 4,731,264 A | 3/1988 | Lin et al. |
| 4,756,973 A | 7/1988 | Sakagami et al. |

(Continued)

FOREIGN PATENT DOCUMENTS

| CN | 1498666 A | 5/2004 |
| CN | 102112803 A | 6/2011 |

(Continued)

OTHER PUBLICATIONS

Frigoli et al., "Design of Mesomorphic Diarylethene-Based Photochromes", Journal of the American Chemical Society, 2004, pp. 15382-15383, vol. 126, No. 47.

*Primary Examiner* — David A Vanore
(74) *Attorney, Agent, or Firm* — The Webb Law Firm (57) ABSTRACT

A system for customization of a photochromic article (14) includes a container (12) having an interior (28). At least one actinic radiation source (34) is located in the interior (28) of the container (12). At least one deactivation radiation source (36) is located in the interior (28) of the container (12). A method of customizing a photochromic article (14) includes inserting a photochromic article (14) having at least one non-thermally reversible photochromic material into a container (12) having at least one actinic radiation source (34) and actuating the at least one actinic radiation source (34) to activate the at least one non-thermally reversible photochromic material.

20 Claims, 3 Drawing Sheets

(51) Int. Cl.
  *G02F 1/00* (2006.01)
  *G02B 1/12* (2006.01)
  *G02C 13/00* (2006.01)
  *B01J 19/12* (2006.01)
  *C09K 3/10* (2006.01)

(52) U.S. Cl.
  CPC ......... *G02C 13/001* (2013.01); *G02F 1/0063* (2013.01); *C09K 2003/1062* (2013.01); *G02C 2202/16* (2013.01)

(58) Field of Classification Search
  CPC ........... G02B 1/12; G02B 5/23; G02F 1/0063; C09K 2003/1062
  See application file for complete search history.

(56) References Cited

U.S. PATENT DOCUMENTS

| | | | |
|---|---|---|---|
| 5,108,427 A * | 4/1992 | Majercik | G02C 7/16 446/389 |
| 5,134,191 A | 7/1992 | Takarada et al. | |
| 5,231,156 A | 7/1993 | Lin | |
| 5,462,806 A | 10/1995 | Konishi et al. | |
| 5,645,767 A | 7/1997 | Van Gemert | |
| 5,658,501 A | 8/1997 | Kumar et al. | |
| 5,962,617 A | 10/1999 | Slagel | |
| 6,296,785 B1 | 10/2001 | Nelson et al. | |
| 7,256,921 B2 | 8/2007 | Kumar et al. | |
| 7,258,437 B2 * | 8/2007 | King | G02C 7/061 351/159.61 |
| 7,416,682 B2 | 8/2008 | Frigoli et al. | |
| 7,452,611 B2 | 11/2008 | Blackburn et al. | |
| 8,444,450 B2 | 5/2013 | Shibahashi et al. | |
| 8,497,639 B2 | 7/2013 | Tsang et al. | |
| 8,649,081 B1 | 2/2014 | DeMeio et al. | |
| 10,371,866 B2 * | 8/2019 | Frease | B29D 11/00009 |
| 10,423,061 B2 | 9/2019 | Tomasulo et al. | |
| 10,768,447 B2 * | 9/2020 | Blum | G02C 11/08 |
| 11,036,065 B2 * | 6/2021 | Nguyen | G02B 5/3016 |
| 11,422,089 B2 * | 8/2022 | Blackburn | G02C 7/102 |
| 2004/0049040 A1 | 3/2004 | Irie | |
| 2004/0135097 A1 | 7/2004 | Shibahashi et al. | |
| 2007/0052922 A1 * | 3/2007 | King | G02C 7/102 351/159.41 |
| 2015/0286073 A1 * | 10/2015 | Blum | G02C 7/101 359/241 |
| 2016/0299054 A1 | 10/2016 | Vik et al. | |
| 2018/0050549 A1 | 2/2018 | Frease et al. | |
| 2018/0056615 A1 | 3/2018 | Turpen et al. | |
| 2020/0124875 A1 * | 4/2020 | Masad | G02C 7/102 |

FOREIGN PATENT DOCUMENTS

| | | |
|---|---|---|
| JP | 05333460 A | 12/1993 |
| JP | H8134063 A | 5/1996 |
| JP | 3009784 B2 | 2/2000 |
| JP | 200382340 A | 3/2003 |
| JP | 2004277416 A | 10/2004 |
| JP | 2015022093 A | 2/2015 |
| WO | 9420581 A1 | 9/1994 |
| WO | 2004003107 A1 | 1/2004 |
| WO | 2010015990 A2 | 2/2010 |
| WO | 2014043023 A1 | 3/2014 |
| WO | 2015081918 A1 | 6/2015 |
| WO | 2016142496 A1 | 9/2016 |
| WO | 2016144332 A1 | 9/2016 |
| WO | 2016144333 A1 | 9/2016 |
| WO | 2017039669 A1 | 3/2017 |

* cited by examiner

FIG. 4

SYSTEM AND METHOD FOR CUSTOMIZATION OF A PHOTOCHROMIC ARTICLE

CROSS-REFERENCE TO RELATED APPLICATIONS

This application is the United States national phase of International Application No. PCT/EP2017/084634 filed Dec. 27, 2017, the disclosure of which is hereby incorporated by reference in its entirety.

BACKGROUND OF THE INVENTION

Field of the Invention

This invention relates generally to photochromic articles and, more particularly, to a system and/or method for controlling the tint and/or color and/or photochromic pattern of a photochromic article.

Technical Considerations

Photochromic articles change to a predetermined tint when irradiated with actinic radiation. For example, conventional photochromic lenses become darker when exposed to sunlight and then bleach when the wearer moves indoors. When activated, the level of tint of the photochromic lens is predetermined by the lens manufacturer based upon such factors as the photochromic dye chosen and the concentration of the photochromic dye in the lens. Similarly, any photochromic pattern, such as a gradient tint, is also predetermined by the lens manufacturer. The wearer has little or no control over the amount of tinting and/or the photochromic pattern on the lens. Further, the user has little or no control over when the photochromic shift occurs. With conventional photochromic lenses, the photochromic lens automatically darkens when exposed to ambient actinic radiation and automatically bleaches when the ambient actinic radiation is removed.

Environmental factors, personal preference, aesthetics, or other conditions could cause the user of a photochromic article to desire a color and/or tint and/or pattern that varies from the predetermined manufacturer specifications when the photochromic article is activated. Therefore, it would be desirable to provide a system and/or method to overcome at least some of the shortcomings of known photochromic articles. For example, it would be beneficial to provide a system and/or method for controlling the tint and/or color and/or pattern of a photochromic article. For example, it would be beneficial to provide a system and/or method to allow a user to have more control over the light management attributes of a photochromic article. For example, it would be desirable to provide a system and/or method in which the user could select the degree of tint and/or color regardless of ambient lighting conditions. For example, it would be desirable to provide a system and/or method in which the user could select one or more photochromic patterns. For example, it would be desirable to provide a user with at least some control over when and/or to what degree the photochromic article activates. For example, it would be desirable to provide a user with at least some control over when and/or to what degree the photochromic article deactivates.

SUMMARY OF THE INVENTION

A system for customization of a photochromic article comprises a container having an interior; at least one actinic radiation source in the interior of the container; and at least one deactivation radiation source in the interior of the container. The system can include a photochromic article.

A method of customizing a photochromic article comprises inserting a photochromic article comprising at least one non-thermally reversible photochromic material into a container comprising at least one actinic radiation source; and actuating the at least one actinic radiation source to activate the at least one non-thermally reversible photochromic material. The method can also include inserting the photochromic article into the container and actuating at least one deactivation radiation source to deactivate the at least one non-thermally reversible photochromic material.

BRIEF DESCRIPTION OF THE DRAWINGS

A complete understanding of the invention will be obtained from the following description when taken in connection with the accompanying drawing figures, wherein like reference numbers identify like parts throughout.

DESCRIPTION OF THE INVENTION

As used herein, the singular form of "a", "an", and "the" include plural referents unless the context clearly dictates otherwise.

Spatial or directional terms, such as "left", "right", "inner", "outer", "above", "below", and the like, relate to the invention as shown in the drawing figures and are not to be considered as limiting as the invention can assume various alternative orientations.

All numbers used in the specification and claims are to be understood as being modified in all instances by the term "about". By "about" is meant plus or minus twenty-five percent of the stated value, such as plus or minus ten percent of the stated value. However, this should not be considered as limiting to any analysis of the values under the doctrine of equivalents.

Unless otherwise indicated, all ranges or ratios disclosed herein are to be understood to encompass the beginning and ending values and any and all subranges or subratios subsumed therein. For example, a stated range or ratio of "1 to 10" should be considered to include any and all subranges or subratios between (and inclusive of) the minimum value of 1 and the maximum value of 10; that is, all subranges or subratios beginning with a minimum value of 1 or more and ending with a maximum value of 10 or less. The ranges and/or ratios disclosed herein represent the average values over the specified range and/or ratio.

The terms "first", "second", and the like are not intended to refer to any particular order or chronology, but refer to different conditions, properties, or elements.

All documents referred to herein are "incorporated by reference" in their entirety.

The term "at least" is synonymous with "greater than or equal to".

The term "not greater than" is synonymous with "less than or equal to".

As used herein, "at least one of" is synonymous with "one or more of". For example, the phrase "at least one of A, B, and C" means any one of A, B, or C, or any combination of any two or more of A, B, or C. For example, "at least one of A, B, and C" includes A alone; or B alone; or C alone; or A and B; or A and C; or B and C; or all of A, B, and C.

The term "adjacent" means proximate to but not in direct contact with.

The term "includes" is synonymous with "comprises".

The term "optical" means pertaining to or associated with light and/or vision. For example, an optical element, article, or device can be chosen from ophthalmic elements, articles, and devices, display elements, articles, and devices, visors, windows, and mirrors.

The term "ophthalmic" means pertaining to or associated with the eye and vision. Non-limiting examples of ophthalmic articles or elements include corrective and non-corrective lenses, including single vision or multi-vision lenses, which may be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, contact lenses, intra-ocular lenses, magnifying lenses, and protective lenses or visors.

As used herein, the terms "lens" and "lenses" mean and encompass at least individual lenses, lens pairs, partially formed (or semi-finished) lenses, fully formed (or finished) lenses, and lens blanks.

As used herein, the term "transparent", such as used in connection with a substrate, film, material, and/or coating, means that the indicated substrate, film, material, and/or coating has the property of transmitting light without appreciable scattering so that objects lying beyond are visibly observable.

As used herein, the term "coating" means a supported film derived from a flowable coating material, which can optionally have a uniform thickness, and specifically excludes polymeric sheets. The terms "layer" and "film" each encompass both coatings (such as a coating layer or a coating film) and sheets, and a layer can include a combination of separate layers, including sub-layers and/or over-layers. The verb "coating" means, within appropriate context, the process of applying a coating material (or materials) to the substrate to form a coating (or coating layer).

As used herein, the term "curable" means a material capable of polymerizing or crosslinking. The terms "cure", "cured", and related terms, mean that at least a portion of the polymerizable and/or crosslinkable components that form a curable composition are at least partially polymerized and/or crosslinked. The degree of crosslinking can range from 5% to 100% of complete crosslinking. For example, the degree of crosslinking can range from 30% to 95%, such as 35% to 95%, or 50% to 95%, or 50% to 85% of complete crosslinking. The degree of crosslinking can range between any combination of these recited lower and upper values, inclusive of the recited values.

As used herein, the term "ophthalmic substrate" means lenses, partially formed lenses, and lens blanks.

As used herein, the term "photochromic optical element" means a substrate having at least one photochromic material located over at least a portion of the substrate and/or incorporated into the substrate.

As used herein, the term "display" means the visible or machine-readable representation of information in words, numbers, symbols, designs or drawings. Non-limiting examples of display elements, articles and devices include screens, and monitors.

As used herein, the term "polymer" means homopolymers (e.g., prepared from a single monomer species), copolymers (e.g., prepared from at least two monomer species), and graft polymers.

As used herein, the term "actinic radiation" and similar terms, such as "actinic light", mean electromagnetic radiation that is capable of causing a response in a material, such as, but not limited to, transforming a photochromic material or a photochromic-dichroic material from one form or state to another form or state. For example, transforming a photochromic compound or a photochromic-dichroic compound from a first, e.g., deactivated, state to a second, e.g., activated, state.

As used herein, the term "deactivation radiation" means electromagnetic radiation that is capable of causing a response in a material, such as, but not limited to, transforming a photochromic material or a photochromic-dichroic material from one form or state to another form or state. For example, transforming a photochromic compound or a photochromic-dichroic compound from an activated state to a deactivated state.

As used herein, the term "photochromic" means having an absorption spectrum for at least visible radiation that varies in response to the absorption of actinic radiation.

As used herein, the terms "photochromic compound", "photochromic composition", and "photochromic coating composition", include thermally reversible photochromic compounds and non-thermally reversible photochromic compounds.

The term "thermally reversible photochromic compound" means a compound capable of converting from a first state to a second state in response to actinic radiation, and reverting back to the first state in response to thermal energy. A "thermally reversible photochromic material" is or comprises at least one thermally reversible photochromic compound.

The term "non-thermally reversible photochromic compound" means a compound capable of converting from a first state to a second state in response to actinic radiation, and reverting back to the first state in response to deactivation radiation of one or more wavelengths. A "non-thermally reversible photochromic material" is or comprises at least one non-thermally reversible photochromic compound.

As used herein, the term "dichroic" means capable of absorbing one of two orthogonal plane polarized components of at least transmitted radiation more strongly than the other.

As used herein, the term "photochromic-dichroic" and similar terms, such as "photochromic-dichroic compound", mean possessing and/or providing both photochromic properties (i.e., having an absorption spectrum for at least visible radiation that varies in response to at least actinic radiation), and dichroic properties (i.e., capable of absorbing one of two orthogonal plane polarized components of at least transmitted radiation more strongly than the other). A "photochromic-dichroic material" is or comprises at least one photochromic-dichroic compound.

As used herein, the term "photochromic material" means any material that is adapted to display photochromic properties (i.e. adapted to have an absorption spectrum for at least visible radiation that varies in response to absorption of at least actinic radiation). A "photochromic material" is or comprises at least one photochromic compound and/or at least one photochromic-dichroic compound.

As used herein to modify the term "state", the terms "first" and "second" are not intended to refer to any particular order or chronology but refer to two different conditions or properties. For purposes of non-limiting illustration, the first state and the second state of a photochromic compound of a photochromic layer can differ with respect to at least one optical property, such as but not limited to the absorption of visible and/or UV radiation. Thus, the photochromic compound of a photochromic layer can have a different absorption spectrum in each of the first and second state. For example, the photochromic compound of a photochromic layer can be clear in the first state and colored in the second state. Alternatively, the photochromic compound of a photochromic layer can have a first color in the first state and a second color in the second state.

With respect to coating layers or films, the term "over" means farther from the substrate (or base layer) on which the coating layer or film under discussion is located. For example, a second layer located "over" a first layer means that the second layer is located farther from the substrate (or base layer) than is the first layer. The second layer can be in direct contact with the first layer. Alternatively, one or more other layers can be located between the first layer and the second layer.

As used herein, the term "UV" means ultraviolet, such as ultraviolet radiation. The terms "ultraviolet radiation" and "ultraviolet light" mean electromagnetic radiation having a wavelength in the range of 100 nm to less than 380 nm.

The terms "visible radiation" and "visible light" mean electromagnetic radiation having a wavelength in the range of 380 nm to 780 nm.

As used herein, the term "IR" means infrared, such as infrared radiation. The term "infrared radiation" means electromagnetic radiation having a wavelength in the range of greater than 780 nm to 1,000,000 nm.

The discussion of the invention may describe certain features as being "particularly" or "preferably" within certain limitations (e.g., "preferably", "more preferably", or "even more preferably", within certain limitations). It is to be understood that the invention is not limited to these particular or preferred limitations but encompasses the entire scope of the disclosure.

The invention comprises, consists of, or consists essentially of, the following aspects of the invention, in any combination. Various aspects of the invention are illustrated in separate drawing figures. However, it is to be understood that this is simply for ease of illustration and discussion. In the practice of the invention, one or more aspects of the invention shown in one drawing figure can be combined with one or more aspects of the invention shown in one or more of the other drawing figures.

The invention will be described with respect to a photochromic article in the form of a photochromic eyewear. However, it is to be understood that the invention is not limited to photochromic eyewear but could be practiced with various photochromic articles, such as optical articles, ophthalmic articles or elements, display articles or elements, visors, windows, mirrors, and office dividers. Examples of ophthalmic articles or elements include corrective and non-corrective lenses, including single vision or multi-vision lenses, which can be either segmented or non-segmented multi-vision lenses (such as, but not limited to, bifocal lenses, trifocal lenses, and progressive lenses), as well as other elements used to correct, protect, or enhance (cosmetically or otherwise) vision, including without limitation, clip-on lenses, contact lenses, intra-ocular lenses, magnifying lenses, protective lenses, and visors. Examples of display articles, elements and devices include screens, monitors, and security elements, including without limitation, security marks and authentication marks. Examples of windows include automotive and aircraft transparencies, filters, shutters, and optical switches. For example, the photochromic article can be selected from eyewear, contact lenses, and clip-on lenses.

Figure 1:
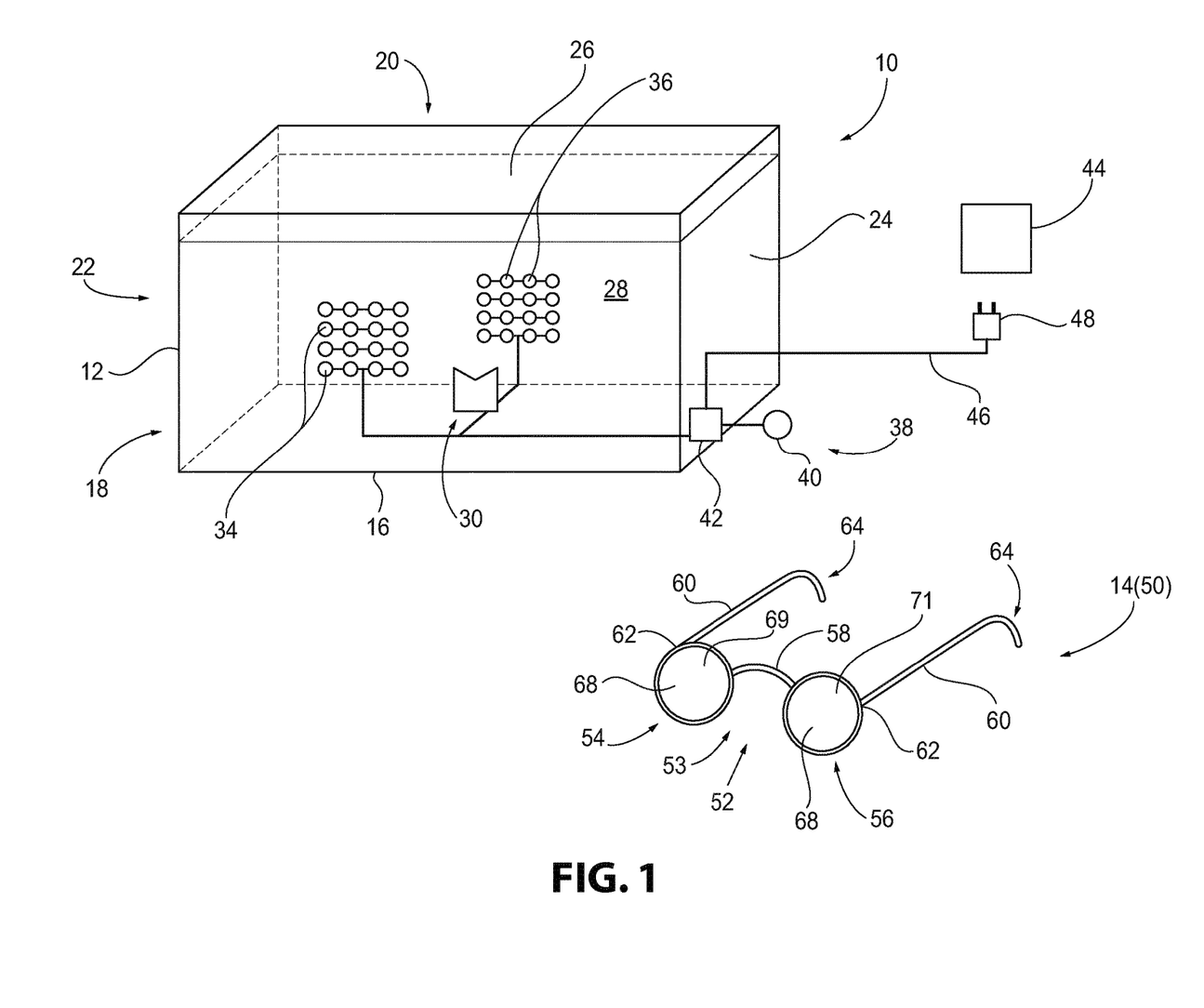
FIG. 1 illustrates an exemplary customization system showing a broken, perspective view (not to scale) of an exemplary container and a perspective view (not to scale) of an exemplary photochromic article.

An exemplary customization system 10 is shown in FIG. 1. The customization system 10 can include a container 12. The customization system 10 can include a photochromic article 14.

The exemplary container 12 shown is FIG. 1 includes a bottom 16, a front wall 18, a rear wall 20, and a pair of side walls 22, 24. The exemplary container 12 includes a top 26 in the form of a lid that can be opened and closed to provide access to an interior 28 of the container 12. The container 12 can be of any desired shape or dimensions. The container 12 need not be rectangular as shown in the illustrated example but could be, for example, oval, spherical, square, or any other shape. For example, the container 12 could be in the shape of a conventional eye glasses case having two elongated halves connected by hinges. The container 12 can be made out of any desired material, such as plastic or metal.

An optional holder 30 can be located in the interior 28 of the container 12. The holder 30 can be of any shape or structure configured to reversibly secure the photochromic article 14 in the container 12. For example, the holder 30 can comprise a pair of spaced posts. In another example, the holder 30 can comprise a strap.

The container 12 includes at least one actinic radiation source 34 in the interior 28 of the container 12. In the illustrated example, the at least one actinic radiation source 34 is located on the front wall 18. However, it is to be understood that the at least one actinic radiation source 34 could be located on any surface in the interior 28 of the container 12. In the example shown in FIG. 1, the at least one actinic radiation source 34 is in the form of an array of actinic radiation sources 34. Examples of actinic radiation sources 34 include light emitting diodes. Examples of light emitting diodes include micro light emitting diodes, nano light emitting diodes, and pico light emitting diodes. The actinic radiation sources 34 can emit actinic radiation in one or more selected regions of the electromagnetic spectrum. For example, the actinic radiation sources 34 can emit one or more wavelengths or ranges of wavelengths of UV light, visible light, or UV light and visible light. For example, the actinic radiation sources 34 can emit one or more wavelengths or ranges of wavelengths of UV light. All of the actinic radiation sources 34 can emit the same wavelength or range of wavelengths of actinic radiation. Alternatively, one or more of the actinic radiation sources 34 can emit a first wavelength or range of wavelengths of actinic radiation and one or more other actinic radiation sources 34 can emit a second wavelength or range of wavelengths of actinic radiation. For example, the at least one actinic radiation source 34 can comprise at least one first actinic radiation source 34 and at least one second actinic radiation source 34. A wavelength or range of wavelengths of actinic radiation emitted by the at least one first actinic radiation source 34 can be different than a wavelength or range of wavelengths of actinic radiation emitted by the at least one second actinic radiation source 34.

The container 12 includes at least one deactivation radiation source 36 in the interior 28 of the container 12. In the illustrated example, the at least one deactivation radiation source 36 is located on the rear wall 20. However, it is to be understood that the at least one deactivation radiation source 36 could be located on any surface in the interior 28 of the container 12. In the example shown in FIG. 1, the at least one deactivation radiation source 36 is in the form of an array of deactivation radiation sources 36. Examples of deactivation radiation sources 36 include light emitting diodes. Examples of light emitting diodes include micro light emitting diodes, nano light emitting diodes, and pico light emitting diodes. The deactivation radiation sources 36 can emit deactivation radiation in a selected region of the electromagnetic spectrum. For example, the deactivation radiation sources 36 can emit one or more wavelengths or ranges of wavelengths of UV light, visible light, or UV light and visible light. For example, the deactivation radiation sources 36 can emit one or more wavelengths or ranges of wavelengths of visible light. All of the deactivation radiation sources 36 can emit the same wavelength or range of wavelengths of deactivation radiation. Alternatively, one or more of the deactivation radiation sources 36 can emit a first wavelength or range of wavelengths of deactivation radiation and one or more other deactivation radiation sources 36 can emit a second wavelength or range of wavelengths of deactivation radiation. For example, the at least one deactivation radiation source 36 can comprise at least one first deactivation radiation source 36 and at least one second deactivation radiation source 36. A wavelength or range of wavelengths of deactivation radiation emitted by the at least one first deactivation radiation source 36 can be different than a wavelength or range of wavelengths of deactivation radiation emitted by the at least one second deactivation radiation source 36.

The one or more actinic radiation sources 34 and/or one or more deactivation radiation sources 36 need not be in the form of an array. For example, at least one actinic radiation source 34 and/or at least one deactivation radiation source 36 can be located in the interior 28 of the container 12. Actinic radiation from the at least one actinic radiation source 34 and/or deactivation radiation from the at least one deactivation radiation source 36 can be channeled from the sources 34, 36 via one or more waveguides. For example, the waveguides can comprise optical fibers or hollow conduits.

Further, there need not be two separate arrays, one for the actinic radiation sources 34 and one for the deactivation radiation sources 36. There could be a single array comprising both the actinic radiation sources 34 and the deactivation radiation sources 36. For example, the actinic radiations sources 34 could alternate with the deactivation radiation sources 36 in a single array. Any other pattern or arrangement of the actinic radiation sources 34 and deactivation radiation sources 36 could also be envisioned.

A control device 38 is operatively linked to the at least one actinic radiation source 34. The same or a different control device 38 can be linked to the at least one deactivation radiation source 36. For example, the control device 38 can comprise a control knob 40 linked to a controller 42. The controller 42 can include control circuitry configured to control the actinic radiation source(s) 34 and/or the deactivation radiation source(s) 36. The controller 42 can include a Bluetooth connection to allow the controller 42 to interface with an external device having a computer-readable storage medium capable of storing computer-readable program code or instructions that cause the control device 38 to execute, configure, or otherwise implement the methods, processes, and transformational data manipulations discussed herein. The external device may be in the form of a personal computer, a personal digital assistant, a portable computer, a laptop, a palmtop, a mobile device, a mobile telephone, a server, or any other type of computing device having the necessary processing hardware to appropriately process data to effectively implement the presently-invented computer-implemented system and/or method. The link between the control device 38 and the external device can be a wireless connection.

The customization system 10 can include a power supply 44 or can be capable of being connected to a power supply 44. The power supply 44 can be, for example, a battery, a capacitor, a solar panel, a vehicle battery, or an electrical grid. For example, the power supply 44 can be a battery removably located in a compartment in the container 12. Alternatively, as shown in FIG. 1, the container 12 can include a cable 46 having a connector 48 connectable to an external power supply 44. The external power supply 44 can be, for example, a vehicle battery or a conventional electrical grid. The components of the container 12, such as the actinic radiation sources 34, the deactivation radiation sources 36, and the control device 38, can be operatively connected by one or more wires, cables, or by any other conventional means.

In the exemplary customization system 10, the photochromic article 14 is illustrated as photochromic eyewear 50. The photochromic article 14 includes a frame 52. The frame 52 includes at least one opening. In the example shown in FIG. 1, the frame 52 includes a frame front 53 having a first opening 54 and a second opening 56. A bridge 58 is located between the first opening 54 and the second opening 56. The frame 52 may be provided in various shapes.

A pair of temples 60 is connected to the frame front 53. The temples 60 have a first end 62 connected to the frame front 53 and a second end 64 spaced from the first end 62. The first ends 62 may be movably (e.g., by hinges) connected to the frame front 53 or rigidly connected to the frame front 53. The second ends 64 of the temples 60 can have a curve, bend, or the like to accept a user's ear when worn. Alternatively, the temples 60 may be straight. The frame 52 and/or the temples 60 may be made of any conventional material, such as polymers, plastics, or metals.

The photochromic article 14 includes at least one photochromic optical element 68. In the photochromic eyewear 50 in FIG. 1, the at least one photochromic optical element 68 is in the form of a first photochromic lens 69 located in the first opening 54 and a second photochromic lens 71 located in the second opening 56.

Figure 2:
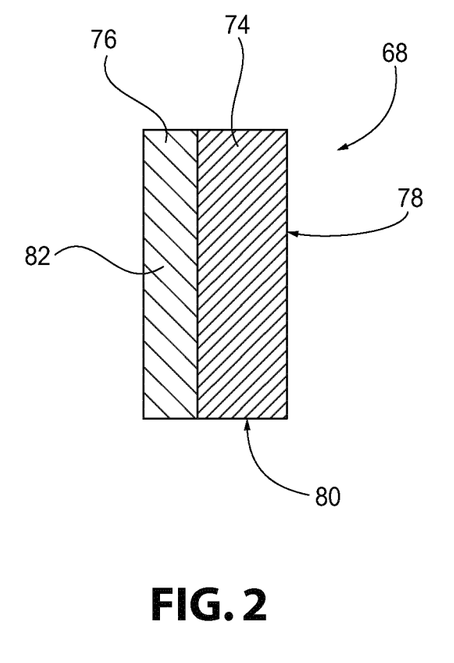
FIG. 2 is a side, sectional view (not to scale) of an exemplary photochromic article in the form of a photochromic lens.

FIG. 2 illustrates a photochromic optical element 68 in the form of a photochromic lens. The photochromic optical element 68 includes an optical substrate 74. The optical substrate 74 has an outer surface 76, an inner surface 78, and a peripheral edge 80. The outer surface 76 generally defines an overall outer physical shape of the optical substrate 74. At least a portion of the outer surface 76 of the optical substrate 74 may have a concave surface, a convex surface, or a planar surface, or a combination of one or more of convex, concave, and planar surfaces.

The optical substrate 74 can be formed from and correspondingly include organic materials, inorganic materials, or combinations thereof (for example, composite materials). Examples of organic materials that can be used as optical substrates 74 include polymeric materials, such as homopolymers and copolymers, prepared from the monomers and mixtures of monomers disclosed in U.S. Pat. No. 5,962,617 and in U.S. Pat. No. 5,658,501 from column 15, line 28 to column 16, line 17. For example, such polymeric materials can be thermoplastic or thermoset polymeric materials, can be transparent or optically clear, and can have any refractive index required. Examples of such monomers and polymers include polyol(allyl carbonate) monomers, e.g., allyl diglycol carbonates such as diethylene glycol bis(allyl carbonate), which monomer is sold under the trademark CR-39 by PPG Industries, Inc.; polyurea-polyurethane (polyurea-urethane) polymers, which are prepared, for example, by the reaction of a polyurethane prepolymer and a diamine curing agent, a composition for one such polymer being sold under the trademark TRIVEX by PPG Industries, Inc.; polyol(meth) acryloyl terminated carbonate monomer; diethylene glycol dimethacrylate monomers; ethoxylated phenol methacrylate monomers; diisopropenyl benzene monomers; ethoxylated trimethylol propane triacrylate monomers; ethylene glycol bismethacrylate monomers; poly(ethylene glycol) bismethacrylate monomers; urethane acrylate monomers; poly (ethoxylated bisphenol A dimethacrylate); poly(vinyl acetate); poly(vinyl alcohol); poly(vinyl chloride); poly(vinylidene chloride); polyethylene; polypropylene; polyurethanes; polythiourethanes; thermoplastic polycarbonates, such as the carbonate-linked resin derived from bisphenol A and phosgene, one such material being sold under the trademark LEXAN; polyesters, such as the material sold under the trademark MYLAR; poly(ethylene terephthalate); polyvinyl butyral; poly(methyl methacrylate), such as the material sold under the trademark PLEXIGLAS, and polymers prepared by reacting polyfunctional isocyanates with polythiols or polyepisulfide monomers, either homopolymerized or co- and/or terpolymerized with polythiols, polyisocyanates, and polyisothiocyanates; and optionally ethylenically unsaturated monomers or halogenated aromatic-containing vinyl monomers. Also contemplated are copolymers of such monomers and blends of the described polymers and copolymers with other polymers, for example, to form block copolymers or interpenetrating network products.

The optical substrate 74 can include untinted, tinted, linearly polarizing, circularly polarizing, elliptically polarizing, photochromic, or tinted-photochromic substrates. As used herein with reference to optical substrates, the term "untinted" means optical substrates that are essentially free of coloring agent additions (such as conventional dyes) and have an absorption spectrum for visible radiation that does not vary significantly in response to actinic radiation. Further, with reference to optical substrates, the term "tinted" means optical substrates that have a coloring agent addition (such as conventional dyes) and an absorption spectrum for visible radiation that does not vary significantly in response to actinic radiation.

The optical substrate 74 may include an inorganic material, an organic polymeric material, and combinations thereof. The optical substrate 74 can be an ophthalmic substrate. Non-limiting examples of organic materials suitable for use in forming ophthalmic substrates include, but are not limited to, the art-recognized polymers that are useful as ophthalmic substrates, such as organic optical resins that are used to prepare optically clear castings for optical applications, such as ophthalmic lenses.

Non-limiting examples of inorganic materials suitable for use in forming the optical substrate 74 include glasses, such as silica based glasses, minerals, ceramics, and metals. For example, the optical substrate 74 can include glass.

The photochromic optical element 68 includes one or more photochromic materials. For example, the photochromic material can comprise one or more non-thermally reversible photochromic compounds and/or one or more thermally reversible photochromic compounds and/or one or more photochromic-dichroic compounds. The photochromic material can be incorporated into the optical substrate and/or can be present in one or more coating layers formed over the optical substrate 74. For example, the photochromic material can be incorporated into a coating layer over the outer surface 76 or inner surface 78. In the illustrated example, the photochromic optical element 68 includes a photochromic layer 82 over at least a portion of the outer surface 76 of the optical substrate 74. The photochromic layer 82 may be optically clear (without a color hue), or it may have a desired color hue. The photochromic layer 82 optionally also can include a static dye.

The photochromic layer 82 may be formed over the entire surface, e.g., outer surface 76, of the optical substrate 74, or over at least a portion of the surface, e.g., outer surface 76, of the optical substrate 74. The photochromic layer 82 may be formed as a mixture of at least two coating compositions using an ultrasonic discharge nozzle of a coating apparatus.

Coating compositions that can be used to form the photochromic layer 82 (and other coating layers discussed below) can include a curable resin composition and, optionally, a solvent. The coating compositions can be in the form of art-recognized liquid coating compositions and powder coating compositions. The coating compositions can be thermoplastic, radiation curable such as by ultraviolet radiation or electron beam, or thermosetting coating compositions. For example, the coating compositions can be selected from curable or thermosetting coating compositions.

Examples of curable resin compositions that can be used with the curable coating compositions include, but are not limited to, curable resin compositions that include an epoxide functional polymer, such as (meth)acrylic polymers containing residues of glycidyl (meth)acrylate, and an epoxide reactive crosslinking agent (e.g., containing active hydrogens, such as hydroxyls, thiols and amines); curable resin compositions that include active hydrogen functional polymer, such as hydroxy functional polymer, and capped (or blocked) isocyanate functional crosslinking agent; curable resin compositions that include active hydrogen functional polymer, such as hydroxy functional polymer, and melamine crosslinking agent; curable polysiloxane coating compositions; and radiation curable compositions that include acrylic functional monomers. Further examples of curable coating compositions are those described herein below as art-recognized hard coat materials. Other examples of coating compositions are disclosed in publications WO 2016/144333, particularly at paragraphs [0026]-[0040]; WO 2016/142496, particularly at paragraphs [0174]-[0193]; and WO 2016/144332, particularly at paragraphs [0018]-[0033].

Curable coating compositions that include a hydroxy functional polymer and a capped isocyanate functional crosslinking agent that can be used to form a photochromic layer 82 typically have present therein hydroxy functional polymer in an amount of from 55 percent to 95 percent by weight, based on total resin solids weight of the composition, e.g., from 75 percent to 90 percent by weight, based on total resin solids weight of the composition. The capped isocyanate functional crosslinking agent is typically present in the curable resin composition in an amount corresponding to the balance of these recited ranges, i.e., 5 to 45, particularly 10 to 25, percent by weight.

With the curable urethane resin compositions that can be used to form the photochromic layer 82, the equivalent ratio of isocyanate equivalents in the capped isocyanate crosslinking agent to hydroxy equivalents in the hydroxy functional polymer is typically within the range of 1:3 to 50:1, e.g., 1:2 to 20:1. Curable coating compositions that include hydroxy functional polymer and capped isocyanate functional crosslinking agent are typically cured at a temperature of from 120° C. to 190° C. over a period of from 10 to 60 minutes.

The curable resin composition of the curable coating compositions can include a first reactant (or component) having functional groups, and a second reactant (or component) that is a crosslinking agent having functional groups that are reactive towards and that can form covalent bonds with the functional groups of the first reactant. In some examples, the first coating composition comprises one or more first reactive groups selected from isocyanate and epoxy, while the one or more additional coating compositions comprise a second reactive group selected from the group consisting of hydroxyl, thiol, primary amine, secondary amine, carbamate, and carboxylic acid. In other examples, the first coating composition comprises an isocyanate first reactive group, and the one or more additional coating compositions comprise a hydroxyl second reactive group. In further examples, the first coating composition comprises an epoxy first reactive group, and the one or more additional coating compositions comprise a carboxylic acid second reactive group. The coating composition comprising the first coating composition and the one or more additional coating compositions may have a ratio between 0.3:1 and 50:1 of the first reactive group in the first coating composition and the second reactive group in the one or more additional coating compositions. The first and second reactants of the curable resin composition can each independently include one or more functional species, and are each present in amounts sufficient to provide cured coatings having a desirable combination of physical properties, e.g., smoothness, optical clarity, solvent resistance and hardness.

Coating compositions that can be used to form the photochromic layer 82 and one or more of the additional coating layers can, optionally, further include a solvent. Examples of suitable solvents include, but are not limited to, acetates, alcohols, ketones, glycols, ethers, aliphatics, cycloaliphatics and aromatics. Examples of acetates include, but are not limited to, ethyl acetate, butyl acetate, and glycol acetate. Examples of ketones include, but are not limited to, methyl ethyl ketone and methyl-N-amyl ketone. Examples of aromatics include, but are not limited to, toluene, naphthalene and xylene. In an example, one or more solvents are added to each of the first reactant and the second reactant. Suitable solvent blends can include, for example, one or more acetates, propanol and its derivatives, one or more ketones, one or more alcohols and/or one or more aromatics. If present, the solvent is typically present in an amount of from 5 to 60 percent by weight, or 5 to 40 percent by weight, or 10 to 25 percent by weight, based on the total weight of the coating composition (inclusive of the solvent weight).

The curable resin composition of the coating compositions that can be used to form the photochromic layer 82 and one or more additional coating layers is a curable urethane (or polyurethane) resin composition. Curable urethane resin compositions useful in forming one or more layers of the first coating layer and one or more additional coating layers include an active hydrogen functional polymer, such as a hydroxy functional polymer; and a capped (or blocked) isocyanate functional crosslinking agent. Hydroxy functional polymers that can be used in such compositions include, but are not limited to, art-recognized hydroxy functional vinyl polymers, hydroxy functional polyesters, hydroxy functional polyurethanes and mixtures thereof.

The photochromic material can be present in the optical substrate 74 and/or the photochromic layer 82. The photochromic material can include, but is not limited to, "conventional photochromic compounds." As used herein, the term "conventional photochromic compound" includes both thermally reversible and non-thermally reversible (or photoreversible) photochromic compounds. Generally, although not limiting herein, when two or more photochromic compounds are used in combination with each other, the various compounds can be chosen to complement one another to produce a desired color or hue. For example, mixtures of photochromic compounds can be used to attain certain activated colors, such as a near neutral gray or near neutral brown. See, for example, U.S. Pat. No. 5,645,767, particularly at column 12, line 66 to column 13, line 19.

Examples of photochromic compounds that can be used include, but are not limited to, indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, thermally reversible photochromic compounds, non-thermally reversible photochromic compounds, and mixtures thereof.

Further examples of photochromic compounds can be selected from certain indeno-fused naphthopyran compounds, such as described in U.S. Pat. No. 6,296,785, particularly at column 3, lines 66 through column 10, line 51.

Additionally or alternatively, the photochromic material can be or can include one or more photochromic-dichroic compounds. Photochromic-dichroic compounds typically have a photochromic group (P) and at least one lengthening agent or group (L) covalently bonded to the photochromic group. The photochromic groups of the photochromic-dichroic compounds can be selected from those classes and examples as described previously with regard to the photochromic compounds, such as pyrans, oxazines, fulgides, and indeno-fused naphthopyrans. Examples of photochromic-dichroic compounds include those disclosed in U.S. Pat. No. 7,256,921 B2, particularly at column 19, line 3 through column 22, line 46. Examples of lengthening groups (L) and photochromic groups (P) include those disclosed in U.S. Pat. No. 7,256,921 B2, particularly at column 22, line 47 through column 35, line 27. Other examples of photochromic-dichroic compounds are disclosed in publication WO 2014/043023, particularly at paragraphs [0104]-[0106].

The photochromic material present in the optical substrate 74 and/or the photochromic layer 82 can be or can include one or more thermally reversible photochromic compounds and/or non-thermally reversible (or photo-reversible) photochromic compounds and/or photochromic-dichroic compounds.

Examples of non-thermally reversible photochromic materials include fulgide compounds, diaryl ethene compounds, photochromic compounds comprising at least one dichroic group, and mixtures thereof. Examples of fulgide compounds include dimethylaminoindolyl fulgide, furyl fulgide, and thienyl fulgide. Examples of diaryl ethene compounds are disclosed in U.S. Pat. No. 8,444,450 at column 3, line 63 to column 12, line 63. Other non-limiting examples include 1-(1,2-dimethylindolyl)-2-(2-cyano-3,5-dimethyl-4-thienyl)-3,3,4,4,5,5-hexafluorocyclopentene, 1-(1,2-dimethyl-3-indolyl)-2-(3-cyano-2,5-dimethyl-4-thienyl)-3,3,4,4,5,5-hexafluorocyclopentene, 1-(1,2-dimethyl-3-indolyl)-2-(2-methyl-3-benzothienyl)-3,3,4,4,5,5-hexafluorocyclopentene, 1,2-bis(5-(4-methoxyphenyl)-2,4-dimethyl-3-thienyl)-3,3,4,4,5,5-hexafluorocyclopentene, 1,2-bis(5-(2-(4-methoxyphenyl)-1-ethenyl)-2,4-dimethyl-3-thienyl)-3,3,4,4,5,5-hexafluorocyclopentene, 1,2-bis(5-(2-(4-cyanophenyl)-1-ethenyl)-2,4-dimethyl-3-thienyl)-3,3,4,4,5,5-hexafluorocyclopentene, 1,2-bis(2,4-dimethyl-5-(2-(2-quinolyl)-1-ethenyl)-3-thienyl)-3,3,4,4,5,5-hexafluorocyclopentene, 1,2-bis(2,4-dimethyl-5-(2-(4-pyridyl)-1-ethenyl)-3-thienyl)-3,3,4,4,5,5-hexafluorocyclopentene, 1,2-bis(2,4-dimethyl-5-(2-(1-naphthyl)-1-ethenyl)-3-thienyl)-3,3,4,4,5,5-hexafluorocyclopentene, 1,2-bis(5-(2-(4-methoxyphenyl)-1-ethenyl)-2-methyl-4-octyl-3-thienyl)-3,3,4,4,5,5-hexafluorocyclopentene, 1,2-bis(5-(2-(4-t-butylphenyl)-1-ethenyl)-2,4-dimethyl-3-thienyl)-3,3,4,4,5,5-hexafluorocyclopentene, 1,2-bis(2,4-dimethyl-5-(2-(2-benzothiazyl)-1-ethenyl)-3-thienyl)-3,3,4,4,5,5-hexafluorocyclopentene, 1-(6-(2-(4-methoxyphenyl)-1-ethenyl)-2-methyl-3-benzothienyl)-2-(5-(4-(4-dimethylaminophenyl)-1,3-butadienyl)-2,4-dimethyl-3-thienyl)-3,3,4,4,5,5-hexafluorocyclopentene, 1-(6-(4-(4-methoxyphenyl)-1,3-butadienyl)-2-methyl-3-benzothienyl)-2-(5-(4-(4-methoxyphenyl)-1,3-butadienyl)-2,4-dimethyl-3-thienyl)-3,3,4,4,5,5-hexafluorocyclopentene, 1,2-bis(6-(4-(4-methoxyphenyl)-1,3-butadienyl)-2-methyl-3-benzothienyl)-3,3,4,4,5,5-hexafluorocyclopentene, 1,2-bis(6-(2-(4-methoxyphenyl)-1-ethenyl)-2-methyl-3-benzothienyl)-3,3,4,4,5,5-hexafluorocyclopentene, 1-(6-(2-(4-dimethylaminophenyl)-1-ethenyl)-2-methyl-3-benzothienyl)-2-(5-(2-(4-cyanophenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(5-(2-(4-cyanohenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(5-(2-(4-methoxyphenyl)-1-ethenyl)-2,4-dimethyl-3-thienyl)-3,3,4,4,5,5-hexafluorocyclopentene, 1-(6-(4-(4-methoxyphenyl)-1,3-butadienyl)-2-methyl-3-benzothienyl)-2-(5-(2-(4-methoxyphenyl)-1-ethenyl)-2,4-dimethyl-3-thienyl)-3,3,4,4,5,5-hexafluorocyclopentene, 1-(6-(2-(4-methoxyphenyl)-1-ethenyl)-2-methyl-3-benzothienyl)-2-(2,4-dimethyl-(5-(4-(4-methoxyphenyl)-1,3-butadienyl)-3-thienyl)-3,3,4,4,5,5-hexafluorocyclopentene, 1-(1,2-dimethyl-3-indolyl)-2-(2-cyano-3-methoxy-5-methylthienyl)-3,3,4,4,5,5-hexafluorocyclopentene, 1,2-bis(2-methyl-5-phenyl-3-thienyl)-3,3,4,4,5,5-hexafluorocyclopentene, 1,2-bis(2,4-dimethyl-5-phenyl-3-thienyl)-3,3,4,4,5,5-hexafluorocyclopentene, 1,2-bis(5-methyl-2-phenyl-4-thienyl)-3,3,4,4,5,5-hexafluorocyclopentene, 1,2-bis(2-methylbenzothiophen-3-yl)-3,3,4,4,5,5-hexafluorocyclopentene, 1,2-bis(3-methylbenzothiophen-2-yl)-3,3,4,4,5,5-hexafluorocyclopentene, 1,2-bis(3-methyl-2-thienyl)-3,3,4,4,5,5-hexafluorocyclopentene, 1,2-bis(2-methyl-6-nitro-3-benzothienyl)-3,3,4,4,5,5-hexafluorocyclopentene, 1-(3-methyl-2-thienyl)-2-(2-methyl-3-thienyl)-3,3,4,4,5,5-hexafluorocyclopentene, 1,2-bis(5-(4-methylphenyl)-2-methyl-3-thienyl)-3,3,4,4,5,5-hexafluorocyclopentene, 1-(2,4-dimethyl-5-phenyl-3-thienyl)-2-(2-methyl-5-phenyl-3-thienyl)-3,3,4,4,5,5-hexafluorocyclopentene, 1,2-bis(2,4-dimethyl-5-(4-methoxyphenyl)-3-thienyl)-3,3,4,4,5,5-hexafluorocyclopentene, 1-(2-methyl-S-(4-methylphenyl)-3-thienyl)-2-(2,4-dimethyl-5-(4-methylphenyl)-3-thienyl)-3,3,4,4,5,5-hexafluorocyclopentene, 1-(2-methyl-5-(4-methoxyphenyl)-3-thienyl)-2-(2,4-dimethyl-5-(4-methylphenyl)-3-thienyl)-3,3,4,4,5,5-hexafluorocyclopentene, 1-(3-methyl-2-thienyl)-2-(5-methyl-2-phenyl-4-thiazoyl)-3,3,4,4,5,5-hexafluorocyclopentene, 1-(3-methylbenzothiophen-2-yl)-2-(5-methyl-2-phenyl-4-thiazoyl)-3,3,4,4,5,5-hexafluorocyclopentene, 1-(3-methylbenzothiophen-3-yl)-2-(5-methyl-2-phenyl-4-thiazoyl)-3,3,4,4,5,5-hexafluorocyclopentene, 1-(2-methyl-5-methylbenzothiophen-3-yl)-2-(5-methyl-2-phenyl-4-thiazoyl)-3,3,4,4,5,5-hexafluorocyclopentene, 1-(2-methyl-5-phenyl-benzo-thiophen-3-yl)-2-(5-methyl-2-phenyl-4-thiazoyl)-3,3,4,4,5,5-hexafluorocyclopentene, 1-(3-methyl-5-methyl-benzothiophen-2-yl)-2-(5-methyl-2-phenyl-4-thiazoyl)-3,3,4,4,5,5-hexafluorocyclopentene, 1-(3-methyl-5-phenyl-benzothiophen-2-yl)-2-(5-methyl-2-phenyl-4-thiazoyl)-3,3,4,4,5,5-hexafluorocyclopentene, 1-(3-methyl-6-methyl-benzothiophen-2-yl)-2-(5-methyl-2-phenyl-4-thiazoyl)-3,3,4,4,5,5-hexafluorocyclopentene, 1-(3-methyl-6-phenyl-benzo-thiophen-2-yl)-2-(5-methyl-2-phenyl-4-thiazoyl)-3,3,4,4,5,5-hexafluorocyclopentene, 1-(2-methyl-6-methyl-benzothiophen-3-yl)-2-(5-methyl-2-phenyl-4-thiazoyl)-3,3,4,4,5,5-hexafluorocyclopentene, 1-(2-methyl-6-phenyl-benzothiophen-3-yl)-2-(5-methyl-2-phenyl-4-thiazoyl)-3,3,4,4,5,5-hexafluorocyclopentene, and 1-(2-phenyl-5-methyl-4-thiazoyl)-2-(3-methyl-2-thienyl)-3,3,4,4,5,5-hexafluorocyclopentene. A specific non-limiting example of a diaryl ethene compound is 1,2-bis(2,4-dimethyl-5-phenyl-3-thienyl)-3,3,4,4,5,5,-hexafluoro-1-cyclopentane. The diaryl ethene compound can be present in the range of from 0.005 to 20% by weight. For example, the diaryl ethene compound can be present in the range of from 0.01 to 10% by weight.

Other examples of non-thermally reversible photochromic materials are described in WO 2004003107A, US 20040049040, JP 2004277416A, JP 2003082340A, JP 8134063A, and the article entitled "Design of Mesomorphic Diarylethene-Based Photochromes" by Frigoli et al., J. AM. CHEM. SOC., Vol 126, No. 47, 2004, pages 15382-15383.

The photochromic compounds in the photochromic layer 82 can be covalently bonded to the matrix, such as the organic matrix, of the photochromic layer 82. The photochromic compounds can include one or more reactive groups, such as one or more polymerizable groups. The photochromic compounds can be introduced into the photochromic layer 82 or the optical substrate 74 in accordance with art-recognized methods. Such art-recognized methods include, but are not limited to, imbibition, and incorporating the photochromic compounds into a composition from which the particular film, layer or optical substrate is prepared.

The photochromic materials can be present in the photochromic layer 82 and/or the optical substrate 74, in amounts (or ratios) such that the photochromic optical element 68 exhibits desired optical properties. For purposes of non-limiting illustration, the amount and types of photochromic materials can be selected such that the photochromic optical element 68 is clear or colorless when the photochromic materials are in a first state (e.g., a deactivated state), such as the closed-form, and exhibit a desired resultant color when the photochromic materials are in a second state (e.g., an activated state), such as the open-form. Alternatively, the photochromic materials can be colored or tinted in the first state and clear or colorless in the second state. The precise amount of the photochromic materials that are utilized is not critical, provided that a sufficient amount is used to produce the desired effect. The particular amount of the photochromic compounds used can depend on a variety of factors, such as but not limited to, the absorption characteristics of the photochromic materials, the color and intensity of the color desired upon activation, and the method used to incorporate the photochromic materials into a particular layer. Although not limiting herein, the amount of the photochromic materials that are incorporated into the photochromic layer 82 can range from 0.01 to 40 weight percent, such as from 0.05 to 15 weight percent, such as from 0.1 to 5 weight percent, based on the weight of the layer. The same amounts and ranges are applicable with regard to the amount of the photochromic materials that are alternatively or additionally incorporated into the optical substrate 74.

The photochromic article 14 can comprise a first photochromic material and a second photochromic material. For example, the photochromic article 14 can comprise a first non-thermally reversible photochromic material and a second non-thermally reversible photochromic material. For example, the first non-thermally reversible photochromic material can have a first activation wavelength. By "activation wavelength" is meant the wavelength of actinic radiation that causes the photochromic material to change from a first state, such as a deactivated state, to a second state, such as an activated state. The second non-thermally reversible photochromic material can have a second activation wavelength. The first activation wavelength can be different than the second activation wavelength.

The first non-thermally reversible photochromic material can have a first deactivation wavelength. By "deactivation wavelength" is meant the wavelength of radiation that causes the photochromic material to change from an activated state to a deactivated state. The second non-thermally reversible photochromic material can have a second deactivation wavelength. The first deactivation wavelength can be different than the second deactivation wavelength.

The photochromic layer 82 and/or the optical substrate 74 may include nanostructures. For example, the nanostructures can comprise microfibers, nanofibers, and/or nanotubes. Examples of nanostructures include single-wall nanotubes and multi-wall nanotubes. For example, the nanostructures can comprise single-wall or multi-wall carbon nanotubes or single-wall or multi-wall conjugated polymers. Other examples include one-dimensional or quasi-dimensional nanostructures. This class of materials includes organic and inorganic nano-objects with anisotropic shapes, for example, nanowires, nanorods, nanoribbons, and nanofibers. For example, the nanostructures can include electrospun conjugated polymer nanofibers. It is believed that the nanostructures will enhance the depth of penetration of the actinic radiation into the photochromic layer 82 and/or the optical substrate 74. For example, the nanostructures can provide pathways to guide and/or diffuse the actinic radiation into the photochromic layer 82 and/or the optical substrate 74.

The photochromic optical element 68 further can include one or more regions or coating layers comprising UV absorbers. These regions or layers include one or more materials that reflect or block or absorb UV radiation. Examples of useful UV absorbers include antioxidants and UV light absorbers including those available commercially from BASF under the trademarks IRGANOX and TINUVIN. These optional additives, when used, are typically present in amounts up to 10 percent by weight (e.g., from 0.05 to 5 percent by weight), based on total weight of resin solids of the curable resin composition. Other examples of commercially available UV light absorbers include the BLS family of UV absorbers commercially available from Mayzo, Inc. and the Hostavin family of UV absorbers commercially available from Clariant Inc. Other UV absorbers include benzophenones, benzotriazoles, and bisphylenes. When an ultraviolet ray absorbent is blended with the aforementioned thermoplastic resin, effective ultraviolet ray cutting function is exerted by blending 0.001% by weight or more, preferably 0.01% by weight or more, based on the resin weight, of the ultraviolet ray absorbent. For example, from 0.1 to 40% by weight, such as from 1 to 30% by weight. Other examples of UV absorbing materials are disclosed in U.S. Pat. No. 8,444,450, particularly at column 14, line 44 to column 15, line 42. Specific examples include 2,4-dihydroxybenzophenone, 2-hydroxy-4-methoxybenzophenone, 2,2'-dihydroxy-4,4'-dimethoxybenzophenone, 2,2', 4,4'-tetrahydroxybenzophenone, 2-hydroxy-4-methoxybenzophenone-5-sulfonic acid, 2-hydroxy-4-octoxybenzophenone, bis-(2-methoxy-4-hydroxy-5-benzoylphenyl)-methane, 2-[2'-hydroxy-3',5'-di-t-amylphenyl]-benzophenone, 2-hydroxy-4-dodecyloxybenzophenone (trade name: Seasorb 103, mfd. by Sipro Kasei), 2-hydroxy-4-octadecyloxybenzophenone, 2,2'-dihydroxy-4-methoxybenzophenone, 2-hydroxy-4-benzyloxybenzophenone, 2-[2'-hydroxy-3',5'-di-t-amylphenyl]-benzophenone and the like benzophenone ultraviolet ray absorbents, phenyl salicylate, para-t-butylphenyl salicylate, paraoctylphenyl salicylate, 2,4-di-t-butylphenyl-4-hydroxy benzoate, 1-hydroxy benzoate, 1-hydroxy-3-t-butyl-benzoate, 1-hydroxy-3-t-octyl benzoate, resorcinol monobenzoate and the like salicylic acid ultraviolet ray absorbents, ethyl-2-cyano-3,3'-diphenylacrylate, 2-ethylhexyl-2-cyano-3,3'-diphenylacrylate, 2-ethylhexyl-2-cyano-3-phenylcinnate and the like cyanoacrylate ultraviolet ray absorbent, 2-[5-t-butyl-2-hydroxyphenyl]-benzotriazole [trade name: Tinuvin-PS, mfd. by Ciba-Geigy], 2-[5-methyl-2-hydroxyphenyl]-benzotriazole, 2-[2-hydroxy-3,5-bis(α,α-dimethylbenzyl)phenyl]-2H-benzotriazole, 2-[3,5-di-t-butyl-2-hydroxyphenyl]-benzotriazole, 2-[3-t-butyl-5-methyl-2-hydroxyphenyl]-5-chlorobenzotriazole, 2-[3,5-di-t-butyl-2-hydroxyphenyl]-5-chlorobenzotriazole, 2-[3,5-di-t-amyl-2-hydroxyphenyl]-benzotriazole [trade name: Tinuvin-328, mfd. by Ciba-Geigy], methyl-3-[3-t-butyl-5-(2H-benzotriazol-2-yl)-4-hydroxyphenyl]propionate-polyethylene glycol 300 (molecular weight) [trade name: Tinuvin 1130, mfd. by Ciba-Geigy], 2-[3-do decyl-5-methyl-2-hydroxyphenyl]-benzotriazole methyl-3-[3-(2H-benzotriazol-2-yl)-5-t-butyl-4-hydroxyphenyl]propionate-polyethylene glycol 300, 2-[3-t-butyl-5-propyloctylate-2-hydroxyphenyl]-5-chlorobenzotriazole, 2-[2-hydroxyphenyl-3,5-di-(1,1'-dimethylbenzyl)phenyl]-2H-benzotriazole, 2-[2-hydroxy-5-t-octylphenyl]-2H-benzotriazole, 2-[3-t-butyl-5-octyloxycarbonylethyl-2-hydroxyphenyl]-benzotriazole [trade name: Tinuvin 384, mfd. by Ciba-Geigy], 2-[2-hydroxy-5-tetraoctylphenyl]-benzotriazole, 2-[2-hydroxy-4-octoxy-phenyl]-benzotriazole, 2-[2'-hydroxy-3'-(3",4",5",6"-terahydrophthal-imidomethyl)-5'-methylphenyl]-benzotriazole, 2-[2-hydroxy-5-t-butylphenyl]-benzotriazole and the like benzotriazole ultraviolet ray absorbents, and ethanediamido-N-(2-ethoxyphenyl)-N'-(4-isododecylphenyl), and 2,2,4,4-tetramethyl-20-(.beta.-lauryl-oxycarbonyl)-ethyl-7-oxa-3,20-diazodispiro(5,1,11,2)heneicosan-21-one.

FIG. 2 illustrates an exemplary photochromic optical element 68. The optical element 68 includes an optical substrate 74 having a photochromic layer 82 comprising one or more photochromic materials over a surface of the optical substrate 74. However, the photochromic layer 82 can be eliminated and the photochromic material incorporated into the optical substrate 74 itself by methods well known in the art. One more UV attenuating layers may be present incorporating one or more UV absorbers. Additionally or alternatively, the UV absorbers could be incorporated into the optical substrate 74 itself. Similarly, while one or more visible light attenuating layers may be present incorporating one or more visible light attenuating materials, the visible light attenuating materials could be incorporated into the optical substrate 74 itself. Further, the photochromic layer 82 could be located on the inner surface 78 of the optical substrate 74. The region or layer comprising the UV attenuating material and/or the visible light attenuating material can further comprise one or more conventional fixed tint dyes.

The photochromic optical element 68 optionally can include one or more layers in addition to or instead of the photochromic layer 82 and one or more of the optional UV attenuating layers. Examples of such additional layers include, but are not limited to, primer coatings and films; protective coatings and films, including transitional coatings and films and abrasion resistant coatings and films; antireflective coatings and films; polarizing coatings and films; and combinations thereof. As used herein, the term "protective coating or film" refers to coatings or films that can prevent wear or abrasion, provide a transition in properties from one coating or film to another, protect against the effects of polymerization reaction chemicals, and/or protect against deterioration due to environmental conditions such as moisture, heat, ultraviolet light, oxygen, etc.

As used herein, the term "transitional coating and film" means a coating or film that aids in creating a gradient in properties between two coatings or films, or a coating and a film. For example, although not limiting herein, a transitional coating can aid in creating a gradient in hardness between a relatively hard coating and a relatively soft coating. Non-limiting examples of transitional coatings include radiation-cured, acrylate-based thin films as described in U.S. Pat. No. 7,452,611 B2.

As used herein, the term "abrasion resistant coating and film" refers to a protective polymeric material that demonstrates a resistance to abrasion that is greater than a standard reference material, e.g., a polymer made of CR-39® monomer available from PPG Industries, Inc., as tested in a method comparable to ASTM F-735 Standard Test Method for Abrasion Resistance of Transparent Plastics and Coatings Using the Oscillating Sand Method. Non-limiting examples of abrasion resistant coatings include, for example, abrasion-resistant coatings comprising organosilanes, organosiloxanes, abrasion-resistant coatings based on inorganic materials such as silica, titania and/or zirconia, organic abrasion-resistant coatings of the type that are ultraviolet light curable, oxygen barrier-coatings, UV-shielding coatings, and combinations thereof. Non-limiting examples of commercial hard coating products include CRYSTALCOAT™ 124 and HI-GARD® coatings, available from SDC Coatings, Inc. and PPG Industries, Inc., respectively.

The abrasion resistant coating or film (or hard coat layer) can be selected from art-recognized hard coat materials, such as organo-silane abrasion-resistant coatings. Organo-silane abrasion-resistant coatings, often referred to as hard coats or silicone-based hard coatings, are well known in the art, and are commercially available from various manufacturers, such as SDC Coatings, Inc. and PPG Industries, Inc. Reference is made to U.S. Pat. No. 4,756,973, particularly at column 5, lines 1-45; and to U.S. Pat. No. 5,462,806, particularly at column 1, lines 58 through column 2, line 8, and column 3, line 52 through column 5, line 50, which disclosures describe organo-silane hard coatings. Reference is also made to U.S. Pat. Nos. 4,731,264, 5,134,191, 5,231, 156, and International Patent Publication WO 94/20581 for disclosures of organo-silane hard coatings. The hard coat layer can be applied by art-recognized coating methods such as, but not limited to, roll coating, spray coating, curtain coating, and spin coating.

Non-limiting examples of antireflective coatings and films include a monolayer, multilayer or film of metal oxides, metal fluorides, or other such materials, which can be deposited onto the articles disclosed herein (or onto films that are applied to the articles), for example, through vacuum deposition, sputtering, etc.

As will be appreciated, the invention is not limited to use with photochromic eyewear 50. For example, the photochromic article 14 could be in the form of an architectural window. The window could include a photochromic optical element 68, for example, an optical substrate 74 comprising a glass ply. A photochromic layer 82 can be located over a surface of the glass ply, for example, over the outer surface of the glass ply. The glass ply can be held in a frame, such as an architectural window frame.

Operation of the customization system 10 will now be described.

Figure 3:
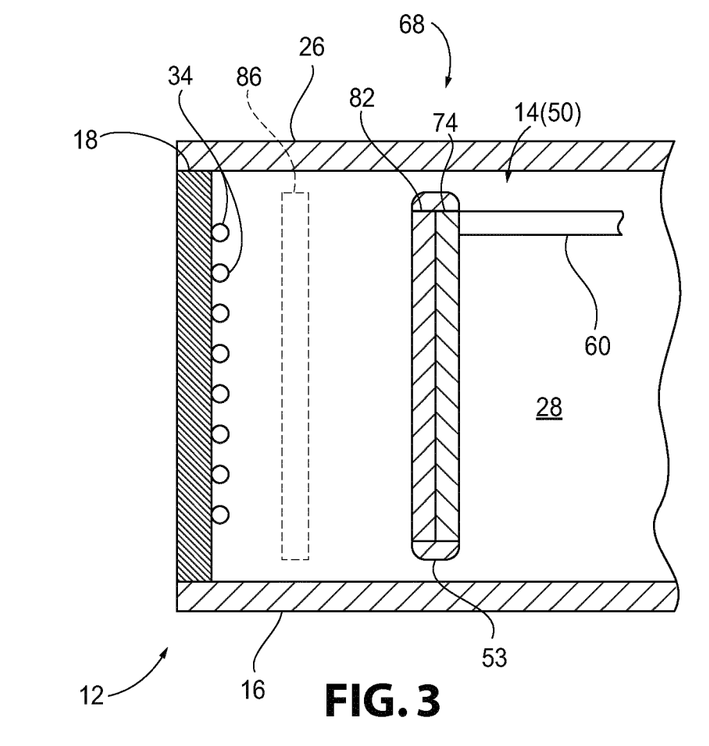
FIG. 3 is a side, sectional view (not to scale) of a portion of the interior of the container of FIG. 1 showing an exemplary photochromic article positioned for activation.

As shown in FIG. 3, a photochromic article 14 is placed into the interior 28 of the container 12 facing the actinic radiation source(s) 34. The user activates the control device 38, such as by turning the control knob 40 or remotely activating the controller 42, to supply electrical power from the power supply 44 to the actinic radiation sources 34. The actinic radiation sources 34 emit actinic radiation, thus activating the photochromic material(s) in the photochromic layer 82 or optical substrate 74. The photochromic material(s) can comprise, for example, one or more non-thermally reversible photochromic materials. Activating the photochromic material(s) causes the photochromic materials to change tint and/or color. The user can select a desired tint and/or color by controlling the energizing time of the actinic radiation sources 34 and/or the level of actinic radiation emitted by the actinic radiation sources 34.

The actinic radiation sources 34 can all emit the same wavelength of actinic radiation or some actinic radiation sources 34 can emit one wavelength of actinic radiation while other actinic radiation sources 34 can emit a different wavelength of actinic radiation. This can allow the user more control over the resultant tint and/or color of the photochromic optical element 68. For example, the photochromic layer 82 (or optical substrate 74) can include a first non-thermally reversible photochromic material having a first activation wavelength and a second non-thermally reversible photochromic material having a second activation wavelength. One or more of the actinic radiation sources 34 can emit radiation of the first activation wavelength and one or more of the other actinic radiation sources 34 can emit actinic radiation of the second activation wavelength. By controlling the emission time and/or intensity of the first actinic radiation sources 34 with respect to that of the second actinic radiation sources 34, the level of activation of the first non-thermally reversible photochromic material with respect to the level of activation of the second non-thermally reversible photochromic material can be controlled. This difference in activation of the non-thermally reversible photochromic materials can be used to control the resultant color and/or tint of the photochromic optical element 68. Of course, a plurality of non-thermally reversible photochromic materials can be present that have different activation wavelengths. Similarly, a plurality of actinic radiation sources 34 can be present that emit different activation wavelengths corresponding to all or at least a portion of the non-thermally reversible photochromic materials.

Figure 4:
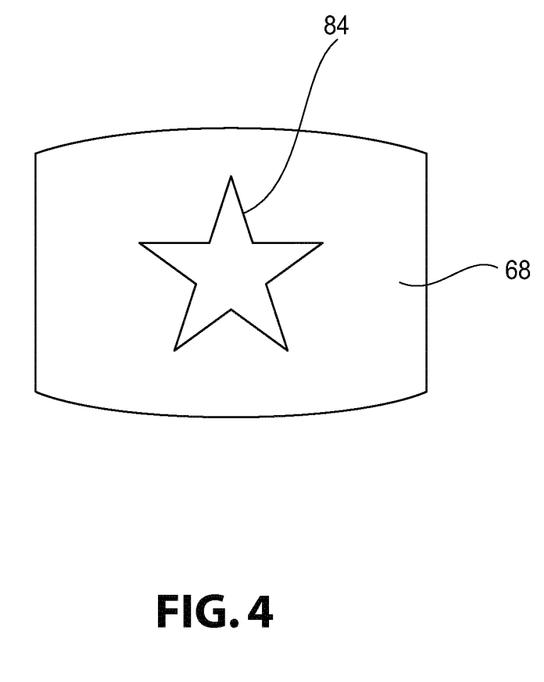
FIG. 4 is a front view (not to scale) of an exemplary photochromic pattern on a photochromic article.

As shown in FIG. 4, the actinic radiation sources 34 can be activated to cause the photochromic material(s) to form a pattern 84 on the photochromic optical element 68. The pattern 84 can be, for example, a gradient of tint and/or color, a design, a text, or a symbol. For example, the actinic radiation sources 34 at the upper side of the photochromic optical element 68 can be activated for a longer time and/or at a higher intensity than the actinic radiation sources 34 at the lower side of the photochromic optical element 68. This would cause a gradient photochromic pattern in tint and/or color between the upper portion of the photochromic optical element 68 and the lower portion of the photochromic optical element 68.

With a photochromic article 14 having a plurality of optical elements 68, such as a photochromic eyewear 50 having a first photochromic lens 69 and a second photochromic lens 71, the actinic radiation sources 34 can be used to form a first color or tint or pattern on one of the optical elements 68 (e.g., the first lens 69) and a second, e.g., different, color or tint or pattern on another of the optical elements 68 (e.g., the second lens 71).

As shown in FIG. 3, an optional mask 86 could be placed between the actinic radiation sources 34 and the photochromic optical element 68. Additionally or alternatively, the mask 86 could be placed directly on the photochromic optical element 68. The mask 86 can have regions of relatively higher and lower transmittance of actinic radiation. For example, the mask 86 could have a higher transmittance of actinic radiation at the upper region of the mask 86 and a lower transmittance of actinic radiation at the lower region of the mask 86, with a gradient of transmittance in between. If all of the actinic radiation sources 34 are activated for the same time and/or intensity, this gradient in transmittance would provide a gradient photochromic pattern on the photochromic optical element 68.

As shown in FIG. 4, the mask 86 could be designed to provide any type of pattern 84. For example, the mask 86 could provide symbols, designs, or words on the photochromic optical element 68.

After activation, the photochromic article 14 is removed from the container 12. If the photochromic material comprises non-thermally reversible photochromic materials, the tint and/or color and/or photochromic pattern on the activated photochromic article 14 will be more stable than would be an article with a thermally reversible photochromic materials. By "more stable" is meant that the duration of the tint and/or color and/or photochromic pattern on the activated photochromic article 14 will be longer and/or the rate of fading would be less than for a similar article with a thermally reversible photochromic material under the same ambient conditions. For example, under some ambient conditions, the change in transmittance of the photochromic article 14 may be less than 10% in one hour. For example, under some ambient conditions, the change in transmittance of the photochromic article 14 may be less than 5% in one hour. For example, under some ambient conditions, the change in transmittance of the photochromic article 14 may be less than 1% in one hour.

Figure 5:
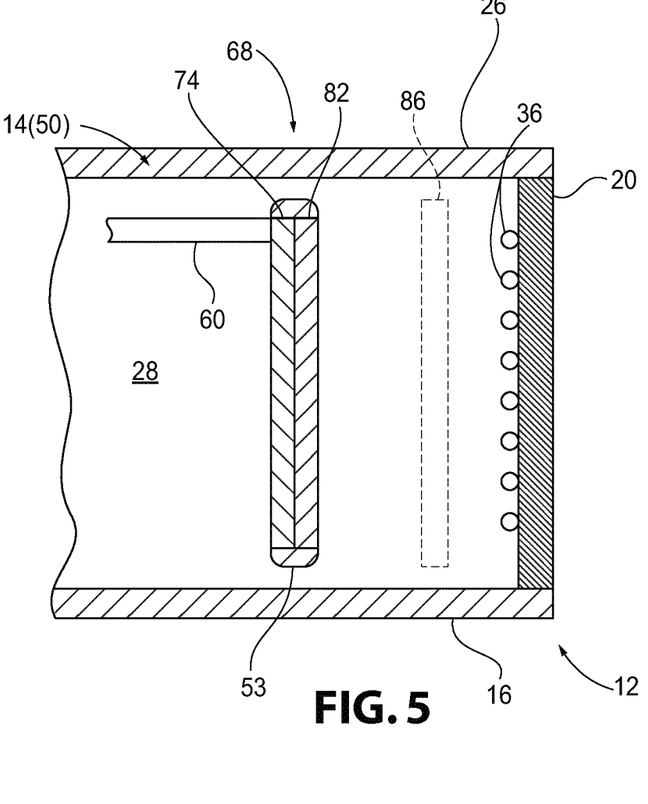
FIG. 5 is a side, sectional view (not to scale) of a portion of the interior of the container of FIG. 1 showing an exemplary photochromic article positioned for deactivation.

As shown in FIG. 5, when the user desires to change the tint and/or color and/or photochromic pattern, the user places the photochromic article 14 back into the container 12 facing the deactivation radiation sources 36. The user activates the control device 38 to supply electrical power to the deactivation radiation sources 36. The deactivation radiation sources 36 emit deactivation radiation, thus deactivating the photochromic material(s), e.g., non-thermally reversible photochromic material(s), in the photochromic layer 82 or optical substrate 74. Deactivating the photochromic material(s) causes the photochromic materials to change tint and/or color. For example, deactivation can cause the photochromic materials to bleach. The user can select a desired amount of deactivation, e.g., tint and/or color, by controlling the energizing time of the deactivation radiation sources 36 and/or the level of deactivation radiation emitted by the deactivation radiation sources 36.

In an alternative method, the user can place the photochromic article 14 in the container 12 facing the actinic radiation sources 34. All of the actinic radiation sources 34 can be activated. This activates all of the photochromic materials, e.g., non-thermally reversible photochromic materials, configured to be activated by the actinic radiation. Then, the user can position the photochromic article 14 to face the deactivation radiation sources 36 (if separate arrays are present). The deactivation radiation sources 36 can be selectively energized to deactivate one or more of the photochromic materials. The amount of deactivation depends on the time and intensity of the deactivation radiation sources 36.

The invention can be characterized further in the following numbered clauses.

Clause 1. A customization system 10 comprises a container 12 having an interior 28. At least one actinic radiation source 34 is located in the interior 28 of the container 12. At least one deactivation radiation source 36 is located in the interior 28 of the container 12.

Clause 2. The system 10 of clause 1, wherein the container 12 includes a holder 30 located in the interior 28 of the container 12.

Clause 3. The system 10 of clauses 1 or 2, wherein the at least one actinic radiation source 34 comprises an array of actinic radiation sources 34.

Clause 4. The system 10 of any of clauses 1 to 3, wherein the at least one actinic radiation source 34 comprises a light emitting diode.

Clause 5. The system 10 of any of clauses 1 to 4, wherein the at least one actinic radiation source 34 emits one or more wavelengths or ranges of wavelengths of UV light.

Clause 6. The system 10 of any of clauses 1 to 5, wherein the at least one actinic radiation source 34 comprises a plurality of actinic radiation sources, and wherein all of the actinic radiation sources 34 emit the same wavelength or range of wavelengths of actinic radiation, preferably UV light.

Clause 7. The system 10 of any of clauses 1 to 5, wherein the at least one actinic radiation source 34 comprises a plurality of actinic radiation sources, and wherein one or more of the actinic radiation sources 34 emits a first wavelength or range of wavelengths of actinic radiation and one or more other actinic radiation sources 34 emits a second wavelength or range of wavelengths of actinic radiation, preferably UV light.

Clause 8. The system 10 of clause 7, wherein the at least one actinic radiation source 34 comprises at least one first actinic radiation source 34 and at least one second actinic radiation source 34, wherein a wavelength of actinic radiation of the at least one first actinic radiation source 34 is different than a wavelength of actinic radiation of the at least one second actinic radiation source 34.

Clause 9. The system 10 of any of clauses 1 to 8, wherein the at least one deactivation radiation source 36 comprises an array of deactivation radiation sources 36.

Clause 10. The system 10 of any of clauses 1 to 9, wherein the at least one deactivation radiation source 36 comprises a plurality of deactivation radiation sources 36, and wherein the deactivation radiation sources 36 emit one or more wavelengths or ranges of wavelengths of deactivation radiation, preferably visible light.

Clause 11. The system 10 of any of clauses 1 to 10, wherein the at least one deactivation radiation source 36 comprises a plurality of deactivation radiation sources 36, and wherein all of the deactivation radiation sources 36 emit the same wavelength or range of wavelengths of deactivation radiation, preferably visible light.

Clause 12. The system 10 of any of clauses 1 to 10, wherein the at least one deactivation radiation source 36 comprises a plurality of deactivation radiation sources 36, and wherein one or more of the deactivation radiation sources 36 emits a first wavelength or range of wavelengths of deactivation radiation and one or more other deactivation radiation sources 36 emits a second wavelength or range of wavelengths of deactivation radiation, preferably visible light.

Clause 13. The system 10 of any of clauses 1 to 12, wherein the at least one deactivation radiation source 36 comprises at least one first deactivation radiation source 36 and at least one second deactivation radiation source 36, wherein a wavelength or range of wavelengths of deactivation radiation of the at least one first deactivation radiation source 36 is different than a wavelength or range of wavelengths of deactivation radiation of the at least one second deactivation radiation source 36.

Clause 14. The system 10 of any of clauses 1 to 13, wherein the at least one actinic radiation source 34 and/or the at least one deactivation radiation source 36 is connected to a waveguide.

Clause 15. The system 10 of any of clauses 1 to 14, wherein the at least one actinic radiation source 34 and the at least one deactivation radiation source 36 are located in a single array.

Clause 16. The system 10 of any of clauses 1 to 15, including a control device 38 operatively linked to the at least one actinic radiation source 34 and/or the at least one deactivation radiation source 36.

Clause 17. The system 10 of any of clauses 1 to 16, wherein the system 10 includes a power supply 44 or is connectable with a power supply 44.

Clause 18. The system 10 of any of clauses 1 to 17, including a photochromic article 14, preferably comprising at least one photochromic optical element 68 comprising an optical substrate 74 and/or a photochromic layer 82.

Clause 19. The system 10 of clause 18, wherein the at least one photochromic optical element 68 comprises at least one photochromic material.

Clause 20. The system 10 of clause 19, wherein the at least one photochromic material comprises at least one of a photochromic compound and a photochromic-dichroic compound.

Clause 21. The system 10 of any of clauses 18 to 20, wherein the photochromic article 14 includes at least one non-thermally reversible photochromic material.

Clause 22. The system 10 of clause 21, wherein the at least one non-thermally reversible photochromic material is located in the optical substrate 74.

Clause 23. The system 10 of clauses 21 or 22, wherein the at least one non-thermally reversible photochromic material is located in the photochromic layer 82.

Clause 24. The system 10 of any of clauses 21 to 23, wherein the at least one non-thermally reversible photochromic material is selected from the group consisting of fulgide compounds, diaryl ethene compounds, photochromic-dichroic materials, and mixtures thereof.

Clause 25. The system 10 of any of clauses 21 to 24, wherein the at least one non-thermally reversible photochromic material comprises at least one diaryl ethene compound.

Clause 26. The system 10 of any of clauses 21 to 25, wherein the at least one non-thermally reversible photochromic material comprises 1,2-bis(2,4-dimethyl-5-phenyl-3-thienyl)-3,3,4,4,5,5,-hexafluoro-1-cyclopentane.

Clause 27. The system 10 of any of clauses 18 to 26, wherein the photochromic article 14 comprises a first non-thermally reversible photochromic material and a second non-thermally reversible photochromic material, wherein the first non-thermally reversible photochromic material has a first activation wavelength and the second non-thermally reversible photochromic material has a second activation wavelength.

Clause 28. The system 10 of clause 27, wherein the first activation wavelength is different than the second activation wavelength.

Clause 29. The system 10 of any of clauses 18 to 28, wherein the photochromic article 14 comprises a first non-thermally reversible photochromic material and a second non-thermally reversible photochromic material, wherein the first non-thermally reversible photochromic material has a first deactivation wavelength and the second non-thermally reversible photochromic material has a second deactivation wavelength.

Clause 30. The system 10 of clause 29, wherein the first deactivation wavelength is different than the second deactivation wavelength.

Clause 31. The system 10 of any of clauses 18 to 30, wherein the photochromic article 14 comprises nanostructures, preferably in the photochromic layer 82 and/or the optical substrate 74.

Clause 32. A method of customizing a photochromic article 14 comprising at least one photochromic material comprises placing the photochromic article 14 into the interior 28 of a container 12 facing at least one actinic radiation source 34, and activating the at least one actinic radiation source 34 to emit actinic radiation to activate the at least one photochromic material, preferably the photochromic material comprises at least one non-thermally reversible photochromic material.

Clause 33. The method of clause 32, wherein the photochromic article 14 comprises at least one of a photochromic layer 82 and an optical substrate 74.

Clause 34. The method of clauses 32 or 33, including controlling at least one of the energizing time of the at least one actinic radiation source 34 and/or the level of actinic radiation emitted by the at least one actinic radiation source 34.

Clause 35. The method of any of clauses 32 to 34, including a plurality of actinic radiation sources 34, wherein the actinic radiation sources 34 all emit the same wavelength or range of wavelengths of actinic radiation.

Clause 36. The method of any of clauses 32 to 34, including a plurality of actinic radiation sources 34, wherein some actinic radiation sources 34 emit one wavelength or range of wavelengths of actinic radiation while other actinic radiation sources 34 emit a different wavelength or range of wavelengths of actinic radiation.

Clause 37. The method of any of clauses 32 to 36, wherein the photochromic article 14 comprises a first non-thermally reversible photochromic material having a first activation wavelength and a second non-thermally reversible photochromic material having a second activation wavelength.

Clause 38. The method of clause 37, wherein one or more first actinic radiation sources 34 emits actinic radiation of the first activation wavelength and one or more second actinic radiation sources 34 emits actinic radiation of the second activation wavelength.

Clause 39. The method of clause 38, including selectively controlling the emission time and/or intensity of the first actinic radiation sources 34 with respect to that of the second actinic radiation sources 34.

Clause 40. The method of any of clauses 32 to 39, including selectively activating the actinic radiation sources 34 to form a pattern 84 on the photochromic article 14.

Clause 41. The method of clause 40, wherein the pattern 84 is selected from the group consisting of a gradient of tint and/or color, a design, text, and a symbol.

Clause 42. The method of any of clauses 32 to 41, including placing a mask 86 between the actinic radiation sources 34 and the photochromic article 14.

Clause 43. The method of clause 42, wherein the mask 86 has regions of differing actinic radiation transmittance.

Clause 44. The method of any of clauses 32 to 43, including placing the photochromic article 14 into the container 12 facing at least one deactivation radiation source 36 and energizing the at least one deactivation radiation source 36 to emit deactivation radiation to deactivate at least a portion of the non-thermally reversible photochromic material(s).

Clause 45. The method of clause 44, including controlling the energizing time of the deactivation radiation sources 36 and/or the level of deactivation radiation emitted by the deactivation radiation sources 36.

Clause 46. The method of clause 32, including activating all the non-thermally reversible photochromic materials configured to be activated by the actinic radiation, then selectively energizing one or more of the deactivation radiation sources 36 to deactivate one or more of the non-thermally reversible photochromic materials.

Clause 47. The method of clause 46, including selectively energizing the deactivation radiation sources 36 to form a pattern 84 on the photochromic article 14.

Clause 48. The system 10 of any of clauses 18 to 31 and/or the method of any of clauses 32 to 47, wherein the photochromic article 14 is selected from the group consisting of optical articles, ophthalmic articles, display articles, eyewear, visors, windows, and mirrors.

Clause 49. The system 10 and/or method of clause 48, wherein the ophthalmic articles are selected from the group consisting of eyewear, corrective lenses, non-corrective lenses, single vision lenses, multi-vision lenses, segmented lenses, non-segmented lenses, clip-on lenses, contact lenses, intra-ocular lenses, magnifying lenses, protective lenses, and visors.

Clause 50. The system 10 and/or method of clause 48, wherein the display articles are selected from the group consisting of screens, monitors, security elements, and authentication marks.

Clause 51. The system 10 and/or method of clause 48, wherein the photochromic article 14 is selected from the group consisting of eyewear, contact lenses, and clip-on lenses.

It will be readily appreciated by those skilled in the art that modifications, as indicated above, may be made to the invention without departing from the concepts disclosed in the foregoing description. Accordingly, the particular aspects described in detail herein are illustrative only and are not limiting to the scope of the invention, which is to be given the full breadth of the appended claims and any and all equivalents thereof.

What is claimed is:

1. A system for customization of a photochromic article, comprising:
    a container having an interior;
    a holder configured to reversibly secure the photochromic article located in the interior of the container;
    at least one actinic radiation source in the interior of the container; and
    at least one deactivation radiation source in the interior of the container.

2. The system of claim 1, wherein the at least one actinic radiation source comprises a plurality of actinic radiation sources.

3. The system of claim 2, wherein the at least one actinic radiation source comprises an array of actinic radiation sources.

4. The system of claim 1, wherein the at least one actinic radiation source comprises at least one first actinic radiation source and at least one second actinic radiation source, wherein a wavelength or range of wavelengths of actinic radiation emitted by the at least one first actinic radiation source is different than a wavelength or range of wavelengths of actinic radiation emitted by the at least one second actinic radiation source.

5. The system of claim 1, wherein the at least one deactivation radiation source comprises a plurality of deactivation radiation sources.

6. The system of claim 5, wherein the at least one deactivation radiation source comprises an array of deactivation radiation sources.

7. The system of claim 1, wherein the at least one deactivation radiation source comprises at least one first deactivation radiation source and at least one second deactivation radiation source, wherein a wavelength or range of wavelengths of deactivation radiation emitted by the at least one first deactivation radiation source is different than a wavelength or range of wavelengths of deactivation radiation emitted by the at least one second deactivation radiation source.

8. The system of claim 1, further including a control device operatively linked to the at least one actinic radiation source and/or the at least one deactivation radiation source, wherein the control device is configured to control at least one of the intensity and duration of the at least one actinic radiation source and/or the at least one deactivation radiation source.

9. The system of claim 1, further comprising a photochromic article.

10. The system of claim 9, wherein the photochromic article comprises at least one of a photochromic material and a photochromic-dichroic material.

11. The system of claim 9, wherein the photochromic article comprises at least one photochromic material comprising at least one non-thermally reversible photochromic material.

12. The system of claim 11, wherein the at least one photochromic material comprises at least one diaryl ethene compound.

13. The system of claim 9, wherein the photochromic article comprises a first non-thermally reversible photochromic material and a second non-thermally reversible photochromic material, wherein the first non-thermally reversible photochromic material has a first activation wavelength and the second non-thermally reversible photochromic material has a second activation wavelength.

14. The system of claim 13, wherein the first activation wavelength is different than the second activation wavelength.

15. The system of claim 9, wherein the photochromic article comprises a first non-thermally reversible photochromic material and a second non-thermally reversible photochromic material, wherein the first non-thermally reversible photochromic material has a first deactivation wavelength and the second non-thermally reversible photochromic material has a second deactivation wavelength.

16. The system of claim 15, wherein the photochromic article comprises at least one non-thermally reversible photochromic material and the at least one non-thermally reversible photochromic material is located in a photochromic layer and/or in an optical substrate.

17. The system of claim 15, wherein the first deactivation wavelength is different than the second deactivation wavelength.

18. The system of claim 9, wherein the photochromic article is selected from the group consisting of optical articles, ophthalmic articles, display articles, eyewear, visors, windows, and mirrors, preferably eyewear, contact lenses, and clip-on lenses.

19. A method of customizing a photochromic article, comprising the steps of:
    inserting a photochromic article comprising at least one non-thermally reversible photochromic material into a container comprising at least one actinic radiation source and securing the photochromic article to a holder configured to reversibly secure the photochromic article located in the interior of the container; and
    actuating the at least one actinic radiation source to activate the at least one non-thermally reversible photochromic material.

20. The method of claim 19, wherein the container further comprises at least one deactivation radiation source and the method includes:
    inserting the photochromic article into the container; and
    actuating the at least one deactivation radiation source to deactivate the at least one non-thermally reversible photochromic material.

* * * * *